United States Patent
Voller et al.

(10) Patent No.: US 10,490,362 B2
(45) Date of Patent: Nov. 26, 2019

(54) METHOD FOR PREVENTING OUTGASSING

(71) Applicant: Zapgo Ltd, Oxfordshire (GB)

(72) Inventors: Stephen David Voller, Hampshire (GB); Timothy Walder, Winchester (GB); Marappa Rajendran, Warwickshire (GB)

(73) Assignee: ZapGo Ltd, Oxfordshire (GB)

( * ) Notice: Subject to any disclaimer, the term of this patent is extended or adjusted under 35 U.S.C. 154(b) by 0 days.

(21) Appl. No.: 15/454,058

(22) Filed: Mar. 9, 2017

(65) Prior Publication Data

US 2017/0263387 A1    Sep. 14, 2017

(30) Foreign Application Priority Data

Mar. 9, 2016   (GB) .................... 1604056.0

(51) Int. Cl.
| | |
|---|---|
| *H01G 11/36* | (2013.01) |
| *H01G 11/62* | (2013.01) |
| *H01G 11/20* | (2013.01) |
| *H01G 11/38* | (2013.01) |
| *H01G 11/58* | (2013.01) |
| *H01G 11/78* | (2013.01) |

(52) U.S. Cl.
CPC ............ *H01G 11/36* (2013.01); *H01G 11/20* (2013.01); *H01G 11/38* (2013.01); *H01G 11/58* (2013.01); *H01G 11/62* (2013.01); *H01G 11/78* (2013.01); *Y02E 60/13* (2013.01)

(58) Field of Classification Search
CPC ........ H01G 11/04; H01G 11/28; H01G 11/36; H01G 11/42; H01G 11/56; H01M 10/052; H01M 10/0561
See application file for complete search history.

(56) References Cited

U.S. PATENT DOCUMENTS

| | | | |
|---|---|---|---|
| 7,924,549 B1 | 4/2011 | Smith et al. | |
| 2004/0179329 A1* | 9/2004 | Iwaida | H01G 9/058 361/508 |
| 2005/0057888 A1* | 3/2005 | Mitchell | H01G 9/058 361/502 |
| 2008/0112112 A1* | 5/2008 | Takemura | H01G 11/46 361/502 |
| 2010/0033899 A1* | 2/2010 | Koh | H01G 9/038 361/502 |
| 2012/0308882 A1* | 12/2012 | Ito | C07D 207/06 429/200 |
| 2013/0286542 A1* | 10/2013 | Madiberk | H01G 11/84 361/502 |
| 2015/0118524 A1* | 4/2015 | Lee | H01M 10/052 429/50 |

FOREIGN PATENT DOCUMENTS

| | | |
|---|---|---|
| CN | 104967701 A | 8/2015 |
| EP | 1557889 A2 | 7/2005 |
| JP | 2000091161 A | 3/2000 |
| JP | 2014179646 A | 9/2014 |
| WO | 2007/021148 A1 | 2/2007 |
| WO | 2012/056050 A2 | 5/2012 |

OTHER PUBLICATIONS

Roman, T., et al., Surface chemistry of carbon electrodes in 1-ethyl-3-methylimidazolium tetrafluoroborate ionic liquid—an in situ infrared study, Electrochemica Acta, 2014, vol. 125, pp. 183-190.

* cited by examiner

*Primary Examiner* — Nguyen T Ha
(74) *Attorney, Agent, or Firm* — Hodgson Russ LLP

(57) ABSTRACT

A method of reducing outgassing in a supercapacitor comprised of carbon-containing electrodes and at least one ionic liquid is characterised by the steps of (a) contacting the carbon-containing electrodes with a tetrafluoroborate salt; (b) applying a potential difference across the carbon-containing electrodes whilst in contact with the salt in a cycle during which electrical charge is stored on and discharged from the electrodes; and (c) continuing further cycles of step (b) until such time as substantially no further outgassing from the system occurs.

12 Claims, No Drawings

METHOD FOR PREVENTING OUTGASSING

This invention relates to a method for substantially preventing undesirable outgassing in supercapacitors employing ionic liquid electrolytes.

In our co-pending applications PCT/GB2015/053003 and GB1518385.8 we have taught supercapacitors comprised of graphene-containing electrodes separated by a porous membrane and an electrolyte comprised of one or more ionic liquids; e.g. quaternary organic salts which are typically liquid at temperatures below 100° C. Whilst such supercapacitors can be easily charged at voltage in excess of 2.5 v and have a good charge-holding capacity, they suffer from the problem that in use and over numerous charging and discharging cycles they have a tendency to outgas. This is generally undesirable if the supercapacitor is to be used as part of or an adjunct to a consumer electronic device such as a tablet or smartphone and is particularly problematic from a safety perspective when the supercapacitor itself is constructed as a lightweight, flexible pouch. In such cases, the pouch itself then tends to expand rapidly giving rise to the risk that it will burst. Typically the products formed in this outgassing process are hydrogen, carbon monoxide and carbon dioxide and a small amount of other volatile organic materials suggesting that they arise from the decomposition of residual water in the system and/or the breaking down of organic functional groups on the surface of the graphene or other carbon components present and/or the decomposition of the electrolyte with catalytic organic and inorganic species present in the system.

We have now developed a method of overcoming this problem which involves pre-treating the electrodes with a tetrafluoroborate salt before the supercapacitor is used for significant charge-storing duty. Thus, according to one aspect of the present invention there is provided a method of reducing outgassing in a supercapacitor comprised of carbon-containing electrodes and at least one ionic liquid characterised by the steps of (a) contacting the carbon-containing electrodes with a tetrafluoroborate salt; (b) applying a potential difference across the carbon-containing electrodes whilst in contact with the salt in a cycle during which electrical charge is stored on and discharged from the electrodes; and (c) continuing further cycles of step (b) until such time as substantially no further outgassing from the system occurs.

Romann et al in Electrochimica Acta 2014 125 pp. 183-190 discusses the decomposition of the ionic liquid 1-ethyl-3-methylimidazolium tetrafluoroborate on the surface of carbon electrodes. CN104867701 teaches a method of making supercapacitors in which water and oxygen is removed by using cycles of vacuum and dry nitrogen gas purge prior to the addition of the electrolyte. JP2014179646 teaches the manufacture of a supercapacitor using gamma-butyrolactone having a very lower moisture content as a solvent for the electrolyte. U.S. Pat. No. 7,924,549 discloses an electrochemical capacitor in which the electrolyte is a quaternary ammonium tetrafluoroborate salt at a concentration of at least 1.5 M in an aprotic solvent. Finally WO2012/056050 teaches a method of increasing the working voltage of a double-layer capacitor by the step-by-step application of progressively higher conditioning voltages until the working voltage is achieved.

In one preferred embodiment of the invention, the carbon-containing electrodes comprise anode and cathode surfaces consisting essentially on an electrically-conductive metal current collector in the form of a thin flexible sheet (for example aluminium, silver or copper foil) coated with a layer comprised of carbon charge-carrying elements. In another embodiment, at least some of these anode and cathode surfaces are disposed on opposite sides of the same current collector sheet. Suitably, at least some of these charge-carrying elements are particles of carbon having an average longest dimension of less than 1 micron, preferably less than 100 nanometres. Preferably, these particles exhibit mesoporosity with the mesopores being in the size range 2 to 50 nanometres. In another embodiment, the carbon charge-carrying elements may be supplemented by nanoparticles of other materials which can confer a degree of pseudocapacitance behaviour on the final supercapacitor; for example salts, hydroxides and oxides of metals such as lithium or transition metals with more than one oxidation state including nickel, manganese, ruthenium, bismuth, tungsten or molybdenum.

In one preferred embodiment, the layer is comprised of carbon particles embedded in a conductive polymer binder matrix and is characterised by the weight ratio of the particles to the binder being in the range 0.2:1 to 20:1. In another embodiment, the carbon particles include graphene particles; in yet another they include carbon nanotubes. In one preferred embodiment a mixture of graphene and carbon nanotubes are employed optionally with activated carbon being present. In another suitable embodiment, the carbon particles comprise a mixture of these three components with the activated carbon, carbon nanotubes and graphene being present in the weight ratio 0.5-2000:0.5-100:1; preferably 0.5-1500:0.5-80:1.

By the term activated carbon is meant any amorphous carbon of high purity whose surface area is typically greater than 500 $m^2g^{-1}$ preferably from 1000 to 3600 $m^2g^{-1}$ and which has an average particle size of less than 1 micron. Such materials are readily available from a number of commercial sources. The carbon nanotubes used typically have an average length in the range 2-200 microns (preferably 100-300 microns) and an average diameter in the range 100-150 nanometres. The nanotubes may be either single- or multi-walled or a mixture of both.

By the term graphene is meant the allotrope of carbon whose particles are substantially two-dimensional in structure. In extremis they comprise single atomic-layer platelets having a graphitic structure although for the purposes of this invention this component may comprise a small number of such platelets stacked one on top of another, e.g. 1 to 20 preferably 1 to 10 platelets. In one embodiment these platelets are in non-oxidised form. In another, the platelets independently have average dimensions in the range 1 to 4000 nanometres preferably 20 to 3000 or 10 to 2000 nanometres as measured by transmission electron microscopy. Any known method can be used to manufacture such materials which are also available commercially; for example under the name Elicarb® by Thomas Swan Limited in the United Kingdom.

In another embodiment, the carbon charge-carrying elements may further include up to 20%, preferably 1 to 20% by weight of a conducting carbon. Suitably, this conducting carbon comprises a highly conductive non-graphitic carbon having a polycrystalline structure and a surface area in the range 1 to 500 $m^2g^{-1}$. In one embodiment it is a carbon black; for example one of those materials which have been used as conducting additive in lithium-ion batteries (e.g. Timical SuperC65® and/or Timical SuperC45).

In one embodiment the residual moisture content of the electrodes after the method of the present invention has been carried out is less than 100 ppm; preferably less than 50 ppm.

Turning to the conductive binder, this is suitably comprised of one or more electrically conductive polymers and is preferably selected from a cellulose derivative, a polymeric elastomer or mixtures thereof. In one embodiment the cellulose derivative employed is a carboxyalkyl cellulose; for example carboxymethyl cellulose. In another embodiment the elastomer is a styrene-butadiene rubber or a material having equivalent properties.

Suitably the total charge-bearing surface area of the charge-carrying elements in the composite layer is >250 $m^2g^{-1}$ preferably >260 $m^2g^{-1}$.

Turning to the ionic liquid electrolyte, this suitably comprises an organic ionic salt which is molten below 100° C. and is preferably so at or below ambient temperatures. In another embodiment, it is a mixture comprised of one or more ionic liquids and the mixture has a viscosity at 25° C. in the range 10 to 80 centipoise; preferably 20 to 50 centipoise. In yet another embodiment, the electrolyte is a eutectic or near-eutectic mixture of at least two components one of which is an ionic liquid. Suitably these mixtures have a melting point below 100° C. preferably below 50° C.; and more preferably below 30° C. Eutectic behaviour is a well-known characteristic of those mixtures of two or more components whose melting point is significantly depressed over a given composition range relative to what might be expected based on the basis of Raoult's law. Here, the term 'eutectic or near-eutectic mixture' is therefore to be construed as encompassing any mixture of components according to the invention whose melting point shows such a depression; with those having a depression greater than 50%, preferably greater than 90% of the depression at the actual eutectic point being most preferred. In an especially preferred embodiment, the eutectic composition itself is employed as the electrolyte. In another, at least one of the ionic liquids employed has an upper limit to its electrochemical window of greater than 3 v.

In one preferred embodiment, the electrolyte employed is a mixture, e.g. a eutectic or near-eutectic mixture, comprised of at least one of the ionic liquids described in U.S. Pat. No. 5,827,602 or WO2011/100232, to which the reader is directed for a complete listing. In another embodiment, the mixture consists of a mixture of at least two of the said ionic liquids.

Suitably, the ionic liquid employed or one of the ionic liquids employed in the electrolyte is thus a quaternary salt of an alkyl or substituted-alkyl pyridinium, pyridazinium, pyrimidinium, pyrazinium, imidazolium, piperidinium, pyrrolidinium, pyrazolium, thiazolium, oxazolium, triazolium or azepanium cation. In such a case, it is preferred that the counter-anion associated with each cation is large, polyatomic and has a Van der Waals volume in excess of 50 or 100 angstroms (see for example U.S. Pat. No. 5,827,602 which again provides illustrative examples contemplated as being within the scope of our invention). It is also preferred that the anion chosen has a non-symmetric morphology with respect to the corresponding cation ensuring that the cations and anions in the liquid do not easily close pack and cause crystallisation. In one embodiment, the counter-anion is selected from the group consisting of tetrafluoroborate, hexafluorophosphate, dicyanamide, bis(fluorosulphonyl)imide (FSI), bis(trifluoromethylsulphonyl)imide (TFSI) or bis (perfluoro$C_2$to$C_4$alkylsulphonyl)imide, e.g. bis(perfluoroethylsulphonyl)imide anions or analogues thereof. In another preferred embodiment the ionic liquid(s) are selected from $C_1$ to $C_4$ alkyl substituted imidazolium, piperidinium or pyrrolidinium salts of these anions with any permutation of cations and anions being envisaged as being disclosed herein. From amongst this list the following binary systems are preferred: a piperidinium salt and an imidazolium salt; a piperidinium salt and a pyrrolidinium salt and an imidazolium salt and a pyrrolidinium salt. In alternative embodiments, the binary system may comprise either (a) a piperidinium salt and any substituted bulky quaternary ammonium salt of one of the above-mentioned anions; e.g. a trialkyl(alkoxyalkyl)ammonium salt thereof where the alkyl or alkoxy moieties independently have one, two, three or four carbon atoms or (b) one or more of the azepanium salts exemplified in WO2011/100232. In all of the cases referred to above, the salts employed should preferably each have an electrochemical window upper limit of greater than 3 volts and a melting point below 30° C.

Specific, non-limiting examples of electrolytes which can be employed include salts or mixtures of salts derived from the following cations; 1-ethyl-3-methyl-imidazolium (EMIM), 1-methyl-1-propylpyrrolidinium, 1-methyl-1-butylpyrrolidinium and the anions mentioned above. In one embodiment, the electrolyte is one or more tetrafluoroborate salts of these cations. In another it is the same salt used in step (a) of the method.

Suitably the water content of the ionic liquid is less than 100 ppm, preferably less than 50 ppm.

In step (a) of the method of the present invention the carbon-containing electrode is treated with a tetrafluoroborate salt. In one embodiment this salt may be present as a highly concentrated solution in a compatible organic solvent; in another the salt itself will be molten under the conditions which steps (a) and (b) occur. Typically, these steps are carried out at a temperature of from 0 to 100° C. Suitably, the tetrafluoroborate salt is employed in the form of a Group IA, Group IIA, quaternary ammonium or phosphonium salt. In one embodiment, the salt used in steps (a) and (b) is an ionic liquid having a cation corresponding to those described above. In another the salt is EMIM tetrafluoroborate. In yet another the tetrafluoroborate salt used is the same as that subsequently employed as the ionic liquid electrolyte.

Step (b) in one embodiment is suitably carried out in a sealed pouch of the type described below or in a pre-treatment cell containing the electrodes and the salt by applying a varying voltage across it at or close to ambient temperature. In another, a higher temperature of up to 100° C. is used. By this means the electrodes are first charged and then discharged in a cycle before being repeated in step (c). This charging and discharging parts of this cycle can be performed at different temperatures if so desired. Typically in step (c) the cycling is repeated at least 3-5 times for example 10 to 60 times. In one embodiment the maximum voltage applied during each cycle is in the range 3 to 7 v. Preferably this maximum voltage does not exceed the upper limit of the electrochemical window of the electrolyte. In another embodiment the pre-treatment cell itself is connected to a device which can measure the degree of outgassing which occurs with each cycle (for example a manometer) enabling step (c) to be terminated when outgassing is observed to have stopped or reduced to below an acceptable upper limit. Floating the system at a selected voltage (for example 1.5 v, 2.0 v, 2.5 v, 3.0 v or 3.5 v) for a specified duration in the range 2 minutes to 12 hours can be carried out in addition to the cycling.

Once step (c) has been completed the electrodes can be used in combination with an ionic liquid electrolyte and a porous membrane in a commercial supercapacitor unit. It will be appreciated that because the contents of the unit are no longer prone to outgassing the supercapacitor maybe be made out of relatively flexible and lightweight materials; for example a sealable, flexible plastic pouch in which the electrodes are supported on metal foil current collectors adapted to protrude therethrough by means of lugs. This design is particularly suitable for use with consumer electronics where space and weight are frequently at a premium or where the pouch needs to conform to a geometry dictated by the aesthetic appearance of the device with which it is to be used.

Whilst not wish to be bound by theory it is currently thought that treatment of the electrodes with the salt in steps (a) to (c) causes the salt to be in part hydrolysed by any residual water thereby reducing the water content of the electrodes to within the acceptable range mentioned above. As a consequence the supercapacitor's subsequent propensity to outgas is considerably reduced or even eliminated entirely.

Thus is a second aspect of the invention there is provided a supercapacitor comprised of carbon-containing anode(s) and cathode(s), intermediate porous membrane(s) and an ionic liquid electrolyte characterised in that the water content of the anode(s) and cathode(s) are less than 100 ppm water. Preferably the water content is less than 50 ppm.

Suitably the components of the supercapacitor are housed in a water-impermeable polymer pouch. In one embodiment the water content of the ionic liquid is likewise less than 100 ppm; preferably less than 50 ppm.

The invention is now illustrated by the following comparative tests.

EXAMPLE 1

A square polymer pouch was manufactured by heat-sealing two square flexible sheets of polyethene along three of the four corresponding sides. Thereafter a pair of anode and cathode electrodes were introduced into the pouches along with an intermediate polyethene and a salt comprising EMIM tetrafluoroborate. Each electrode comprised an aluminium foil current collector on which was disposed an electrode layer consisting of a mixture of carbon nanotubes, graphene, activated carbon (85% by total weight), conductive carbon (5%) embedded in 10% by weight of a matrix comprising styrene-butadiene rubber and carboxymethyl cellulose (50:50). The pouch was then temporarily sealed and subjected to ten charge-discharge cycles from 0 to 3.5 v at a current of 4 amps. At the end of this time the pouch was opened, re-sealed and the electrodes subjected to a further 200 cycles. No expansion of the pouches corresponding to significant outgassing was observed in this subsequent period of cycling.

Comparative Test

In a comparative experiment the pouches were sealed immediately after the components had been introduced. Thereafter after 50 charge-discharge cycles at the conditions mentioned above and without opening and resealing so much expansion of the pouch due to outgassing had occurred as to make it essentially unfit for use.

EXAMPLE 2

The method of Example 1 was repeated except that after the first ten cycles the tetrafluoroborate salt was replaced with the ionic liquid EMIM TFSI before re-sealing took place. Again no significant inflation was seen to occur after a further 200 cycles.

The invention claimed is:

1. A method of reducing outgassing in a supercapacitor comprised of carbon-containing electrodes and at least one ionic liquid that is an organic salt which is molten below 100° C., the method characterised by the steps of (a) treating the carbon-containing electrodes with a tetrafluoroborate salt; (b) applying a potential difference across the carbon-containing electrodes whilst in the presence of the salt in a cycle during which electrical charge is stored on and discharged from the electrodes; and (c) continuing cycles of step (b) until such time as substantially no further outgassing from the system occurs.

2. A method as claimed in claim 1 characterised in that the carbon-containing electrodes include graphene, carbon nanotubes or a mixture thereof.

3. A method as claimed in claim 1 characterised in that the ionic liquid is also a tetrafluoroborate salt.

4. A method as claimed in claim 1 characterised in that the ionic liquid is at least one $C_1$ to $C_4$ alkyl substituted imidazolium, piperidinium or pyrrolidinium salt.

5. A method as claimed in claim 1 characterised in that the tetrafluoroborate salt is EMIM tetrafluoroborate salt.

6. A method as claimed in claim 1 characterised in that supercapacitor comprises a plastic pouch containing the carbon-containing electrodes and the ionic liquid(s).

7. A method of reducing outgassing in a supercapacitor comprised of carbon-containing electrodes and at least one ionic liquid that is an organic salt which is molten below 100° C., the method characterised by the steps of (a) treating the carbon-containing electrodes with an ionic liquid tetrafluoroborate salt that is a quaternary salt of an alkyl or substituted-alkyl pyridinium, pyridazinium, pyrimidinium, pyrazinium, imidazolium, piperidinium, pyrrolidinium, pyrazolium, thiazolium, oxazolium, triazolium or azepanium cation and a tetrafluoroborate anion; (b) applying a potential difference across the carbon-containing electrodes whilst in the presence of the salt in a cycle during which electrical charge is stored on and discharged from the electrodes, wherein the charging and discharging parts of the cycle are performed at different temperatures; and (c) continuing cycles of step (b) at least 10 to 60 times until such time as substantially no further outgassing from the system occurs.

8. A method as claimed in claim 7 characterised in that the carbon-containing electrodes include graphene, carbon nanotubes or a mixture thereof.

9. A method as claimed in claim 7 characterised in that the ionic liquid is also a tetrafluoroborate salt.

10. A method as claimed in claim 7 characterised in that the ionic liquid is at least one C1 to C4 alkyl substituted imidazolium, piperidinium or pyrrolidinium salt.

11. A method as claimed in claim 7 characterised in that the ionic liquid tetrafluoroborate salt is EMIM tetrafluoroborate salt.

12. A method as claimed in claim 7 characterised in that supercapacitor comprises a plastic pouch containing the carbon-containing electrodes and the ionic liquid(s).

* * * * *